(12) United States Patent
Xu et al.

(10) Patent No.: US 9,184,436 B2
(45) Date of Patent: Nov. 10, 2015

(54) METHODS AND ENERGY STORAGE DEVICES UTILIZING ELECTROLYTES HAVING SURFACE-SMOOTHING ADDITIVES

(75) Inventors: Wu Xu, Richland, WA (US); Jiguang Zhang, Richland, WA (US); Gordon L. Graff, West Richland, WA (US); Xilin Chen, Richland, WA (US); Fei Ding, Tianjin (CN)

(73) Assignee: Battelle Memorial Institute, Richland, WA (US)

(*) Notice: Subject to any disclaimer, the term of this patent is extended or adjusted under 35 U.S.C. 154(b) by 0 days.

(21) Appl. No.: 13/495,745

(22) Filed: Jun. 13, 2012

(65) Prior Publication Data

US 2013/0202956 A1  Aug. 8, 2013

Related U.S. Application Data (63) Continuation-in-part of application No. 13/367,508, filed on Feb. 7, 2012.

(51) Int. Cl.
*H01M 10/05* (2010.01)
*H01M 4/04* (2006.01)
*H01M 4/134* (2010.01)
(Continued)

(52) U.S. Cl.
CPC .......... *H01M 4/0445* (2013.01); *H01M 4/0452* (2013.01); *H01M 4/134* (2013.01); *H01M 4/1395* (2013.01); *H01M 4/366* (2013.01); *H01M 10/0567* (2013.01); *Y02E 60/122* (2013.01)

(58) Field of Classification Search
CPC .............. H01M 2300/0017; H01M 2300/00
USPC ............................................................ 429/50
See application file for complete search history.

(56) References Cited

U.S. PATENT DOCUMENTS 4,331,517 A    5/1982  Rechlicz
4,695,521 A *  9/1987  Shacklette et al. ............ 429/337

(Continued)

FOREIGN PATENT DOCUMENTS

EP    1 403 957 A1    3/2004
JO    2003272703 A    3/2002

(Continued)

OTHER PUBLICATIONS

International Search Report and Written Opinion for International Application No. PCT/US2012/051536, International Filing Date Aug. 20, 2012, Date of Mailing Jan. 30, 2013.

(Continued)

*Primary Examiner* — Stewart Fraser
*Assistant Examiner* — Olatunji Godo
(74) *Attorney, Agent, or Firm* — Klarquist Sparkman, LLP (57) ABSTRACT

Electrodeposition and energy storage devices utilizing an electrolyte having a surface-smoothing additive can result in self-healing, instead of self-amplification, of initial protuberant tips that give rise to roughness and/or dendrite formation on the substrate and anode surface. For electrodeposition of a first metal (M1) on a substrate or anode from one or more cations of M1 in an electrolyte solution, the electrolyte solution is characterized by a surface-smoothing additive containing cations of a second metal (M2), wherein cations of M2 have an effective electrochemical reduction potential in the solution lower than that of the cations of M1.

22 Claims, 5 Drawing Sheets

(51) Int. Cl.
    *H01M 4/1395*    (2010.01)
    *H01M 4/36*       (2006.01)
    *H01M 10/0567*   (2010.01)

(56) References Cited

U.S. PATENT DOCUMENTS

| | | | | |
|---|---|---|---|---|
| 5,085,955 | A * | 2/1992 | Cipriano | 429/329 |
| 2002/0192546 | A1* | 12/2002 | Mao et al. | 429/188 |
| 2004/0146786 | A1* | 7/2004 | Sato et al. | 429/326 |
| 2006/0240322 | A1 | 10/2006 | Xu et al. | |
| 2008/0138704 | A1 | 6/2008 | Mizuta et al. | |
| 2009/0197168 | A1 | 8/2009 | Nishida et al. | |
| 2009/0286155 | A1* | 11/2009 | Takehara | 429/199 |
| 2013/0199936 | A1* | 8/2013 | Zhang et al. | 205/263 |

FOREIGN PATENT DOCUMENTS

| | | |
|---|---|---|
| JP | 07-109321 A | 4/1995 |
| JP | 10-027624 A | 1/1998 |
| WO | WO 02/101870 A1 | 12/2002 |

OTHER PUBLICATIONS

Ding et al., "Dendrite-Free Lithium Deposition via Self-Healing Electrostatic Shield Mechanism," *J Am Chem Soc.* 135:4450-4456 and Supplementary Information S1-S12, 2013.

European Supplementary Search Report issued May 15, 2015 for European Patent Application No. 12867997.4.

* cited by examiner

METHODS AND ENERGY STORAGE DEVICES UTILIZING ELECTROLYTES HAVING SURFACE-SMOOTHING ADDITIVES

CROSS-REFERENCE TO RELATED APPLICATIONS

This invention claims priority from, and is a continuation in part of, U.S. patent application Ser. No. 13/367,508, filed Feb. 7, 2012, incorporated herein by reference.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Electrodeposition is widely used to coat a functional material having a desired property onto a surface that otherwise lacks that property. During electrodeposition, electrically charged reactants in an electrolyte solution diffuse, or are moved by an electric field, to cover the surface of an electrode. For example, the electrical current can reduce reactant cations to yield a deposit on an anode. Or, anions of reactants in the electrolyte solution can diffuse, or be moved by the electric field, to cover the surface of a cathode, where the reactant anions are oxidized to form a deposit on the electrode.

Electrodeposition has been successfully utilized in the fields of abrasion and wear resistance, corrosion protection, lubricity, aesthetic qualities, etc. It also occurs in the operation of certain energy storage devices. For example, in the charge process of a metal battery or metal-ion battery, metal ions in the electrolyte move from the cathode and are deposited on the anode. Some organic compounds with unsaturated carbon-carbon double or triple bonds are used as additives in non-aqueous electrolytes and are electrochemically reduced and deposited at the anode surface or oxidized and deposited at the cathode surface to form solid electrolyte interphase layers as protection films on both anode and cathode of lithium batteries. Some other organic compounds with conjugated bonds in the molecules are electrochemically oxidized and deposited at the cathode surface to form electric conductive polymers as organic cathode materials for energy storage devices.

In most instances, the ideal is a smooth electrodeposited coating. For example, a smoothly plated film can enhance the lifetime of a film used for decoration, wear resistance, corrosion protection, and lubrication. A smoothly plated film is also required for energy storage devices, especially for secondary devices. Rough films and/or dendrites generated on electrode surfaces during the charge/discharge processes of these energy storage devices can lead to the dangerous situations, short-circuits, reduced capacities, and/or shortened lifetimes.

Roughness and/or dendrites can be caused by several reasons, including the uneven distribution of electric current density across the surface of the electrodeposition substrate (e.g., anode) and the uneven reactivity of electrodeposited material and/or substrate to electrolyte solvents, reactants, and salts. These effects can be compounded in the particular case of repeated charging-discharging cycles in energy storage devices. Therefore, a need for improved electrolytes for electrodeposition and for energy storage devices are needed to enhance the smoothness of the resultant film.

SUMMARY

This document describes electrolytes for electrodeposition and for energy storage devices that result in self-healing, instead of self-amplification, of initial protuberant tips that are unavoidable during operation. The protuberant tips can give rise to roughness and/or dendrite formation on the electrodeposition substrate and device electrodes.

For electrodeposition of a first metal (M1) on an anode from one or more cations of M1 in an electrolyte solution, embodiments of the electrolyte solution comprise a soluble, surface-smoothing additive comprising a metal (M2). Cations of M2 have an effective electrochemical reduction potential (ERP) in the solution lower than that of the cations of M1.

As used herein, cations, in the context of M1 and/or M2 refer to atoms or molecules having a net positive electrical charge. In but one example, the total number of electrons in the atom or molecule can be less than the total number of protons, giving the atom or molecule a net positive electrical charge. The cations are not necessarily cations of metals, but can also be non-metallic cations. At least one example of a non-metallic cation is ammonium. Cations are not limited to the +1 oxidation state in any particular instance. In some descriptions herein, a cation can be generally represented as $X^+$, which refers generally to any oxidation state, not just +1.

Examples of M1 metals can include, but are not limited to, elemental metals or alloys containing Li, Na, K, Rb, Cs, Be, Mg, Ca, Sr, Ba, Al, Ga, In, Tl, Ge, Sn, Pb, As, Sb, Bi, Se, Te, Bi, Po, Sc, Ti, V, Cr, Mn, Fe, Co, Ni, Cu, Zn, Y, Zr, Nb, Mo, Tc, Ru, Rh, Pd, Ag, Cd, W, Pt, Au, and/or Hg. Preferably, M1 is an elemental metal material comprising Li, Zn, Na, Mg, Al, Sn, Ti, Fe, Ni, Cu, Zn, Ag, Pt, or Au. Most preferably, M1 comprises Li.

Examples of metals for cations of M2 include, but are not limited to, Li, Cs, Rb, K, Ba, La, Sr, Ca, Ra, Zr, Te, B, Bi, Ta, Ga, Eu, S, Se, Nb, Na, Mg, Cu, Al, Fe, Zn, Ni, Ti, Sn, Sb, Mn, V, Ta, Cr, Au, Ge, Co, As, Ag, Mo, Si, W, Ru, I, Fc, Br, Re, Bi, Pt, and/or Pd. In preferred embodiments, cations of M2 are cations of Cs, Rb, K, Ba, Sr, Ca, Li.

A cation of M2 might have a standard electrochemical reduction potential (ERP) that is greater than that of the cations of M1. In such instances, some embodiments of the electrolytes have an activity of M2 cations such that the effective ERP of the M2 cations is lower than that of the cations of M1. Because activity is directly proportional to the concentration and activity coefficient, which depend on the mobility and solvation of the cation in the given electrolyte, a lower activity can be a result of low concentration, low activity coefficient of the cations, or both since the activity is the product of the activity coefficient and concentration. The relationship between effective ERP and activity is described in part by the Nernst equation and is explained in further detail elsewhere herein. In a particular embodiment, the concentration of M2 cations is less than, or equal to, 30% of that of the cations of M1. In another, the concentration of M2 cations is less than, or equal to, 20% of that of the cations of M1. In another, the concentration of M2 cations is less than, or equal to, 10% of that of the cations of M1. In yet another, the concentration of M2 cations is less than, or equal to, 5% of that of the cations of M1

The surface-smoothing additive can comprise an anion that includes, but is not limited to, $PF_6^-$, $BF_4^-$, $AsF_6^-$, $N(SO_2CF_3)_2^-$, $N(SO_2F)_2^-$, $CF_3SO_3^-$, $ClO_4^-$, $I^-$, $Cl^-$, $OH^-$, $NO_3^-$, $SO_4^{2-}$ and combinations thereof. Preferably, the anion comprises $PF_6^-$.

Preferably, the cations of M2 are not chemically or electrochemically reactive with respect to M1 or the cations of M1. Accordingly, the surface-smoothing additive is not necessarily consumed during electrodeposition or during operation of an energy storage device.

In one embodiment, the electrodeposition anode is an anode in an energy storage device. In particular instances, the anode can comprise lithium, carbon, magnesium, sodium, silicon, silicon oxide, tin, tin oxide, antimony and combinations thereof. These materials can also be combined with carbonaceous material or with carbonaceous material and lithium powder. As used herein, an anode is not restricted to a complete structure having both an active material and a current collector. For example, an anode can initially encompass a current collector on which active material is eventually deposited to form an anode. Alternatively, an anode can start out as an active material pasted on a current collector. After initial cycling, the active material can be driven into the current collector to yield what is traditionally referred to as an anode.

Certain embodiments of the present invention encompass energy storage devices that comprise an anode and a M1 metal electrodeposited on the anode during operation of the device. The energy storage device is characterized by an electrolyte solution comprising cations of M1 and by a soluble, surface-smoothing additive comprising a M2 metal, wherein cations of M2 have an effective electrochemical reduction potential in solution lower than that of the cations of M1.

In some embodiments the anode comprises carbon. In other embodiments the anode comprises lithium metal. In other embodiments, the anode comprises silicon. Preferably, the M1 metal comprises lithium. Accordingly, in one example, the energy storage device is a lithium ion battery. In another example, the energy storage device is a lithium metal battery.

In some instances, the device further comprises a cathode comprising lithium intercalation compounds. Examples can include, but are not limited to, $Li_{4-x}M_xTi_5O_{12}$ (M=Mg, Al, Ba, Sr, or Ta; $0 \le x \le 1$), $MnO_2$, $V_2O_5$, $LiV_3O$, $LiM^{C1}_xM^{C2}_{1-x}PO_4$ ($M^{C1}$ or $M^{C2}$=Fe, Mn, Ni, Co, Cr, or Ti; $0 \le x \le 1$), $Li_3V_{2-x}M_x(PO_4)_3$ (M=Cr, Co, Fe, Mg, Y, Ti, Nb, or Ce; $0 \le x \le 1$), $LiVPO_4F$, $LiM^{C1}_xM^{C2}_{1-x}O_2$ ($M^{C1}$ or $M^{C2}$=Fe, Mn, Ni, Co, Cr, Ti, Mg, Al; $0 \le x \le 1$), $LiM^{C1}_xM^{C2}_yM^{C3}_{1-x-y}O_2$ ($M_{C1}$, $M^{C2}$, or $M^{C3}$=Fe, Mn, Ni, Co, Cr, Ti, Mg, or Al; $0 \le x \le 1$; $0 \le y \le 1$), $LiMn_{2-y}X_yO_4$ (X=Cr, Al, or Fe, $0 \le y \le 1$), $LiNi_{0.5-y}X_yMn_{1.5}O_4$ (X=Fe, Cr, Zn, Al, Mg, Ga, V, or Cu; $0 \le y \le 0.5$), $xLi_2MnO_3 \cdot (1-x)LiM^{C1}_yM^{C2}_zM^{C3}_{1-y-z}O_2$ ($M^{C1}$, $M^{C2}$, or $M^{C3}$=Mn, Ni, Co, Cr, Fe, or mixture of; x=0.3-0.5; $y \le 0.5$; $z \le 0.5$), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ ($0 \le y \le 1$).

The M2 metal is preferably selected from the group consisting of Cs, Rb, K, Ba, Sr, Ca, Li, Na, Mg, Al, and combinations thereof. In one embodiment, wherein M1 is Li, the M2 metal is not Na. Examples surface-smoothing additives can include, but are not limited to, anions comprising $PF_6^-$, $AsF_6^-$, $BF_4^-$, $N(SO_2CF_3)_2^-$, $N(SO_2F)_2^-$, $CF_3SO_3^-$, $ClO_4^-$, and combinations thereof.

In some embodiments, the cations of M2 have an activity in solution such that the effective electrochemical reduction potential of M2 is lower than that of the cation of M1. In one example, the cations of M2 have a concentration in the electrolyte solution that is less than, or equal to, 30% of that of the cations of M1. In another, the cations of M2 have a concentration in the electrolyte solution that is less than, or equal to, 20% of that of the cations of M1. In yet another example, the cations of M2 have a concentration in the electrolyte solution that is less than, or equal to, 5% of that of the cations of M1.

According to one embodiment, the energy storage device has an applied voltage less than, or equal to that of the electrochemical reduction potential of the cations of M1 and greater than the effective electrochemical reduction potential of the cations of M2.

In a particular embodiment, an energy storage device comprises an anode and lithium metal electrodeposited on the anode during operation of the device. The energy storage device is characterized by an electrolyte solution comprising Li cations and a soluble, surface-smoothing additive comprising a metal (M2). Cations of M2 have a concentration in solution less than 30% of that of the Li cations and have an effective electrochemical reduction potential in solution lower than that of the Li cations.

The energy storage device can further comprise a separator between the anode and the cathode and the anode can comprise lithium and a non-intercalation carbon layer between the lithium and the separator.

The device can have an applied voltage less than, or equal to, that of the electrochemical reduction potential of the lithium cations and greater than the effective electrochemical reduction potential of the cations of M2.

In some embodiments, the solvent is a non-aqueous, aprotic, polar organic substance that dissolves the solute at room temperature. Blends of more than one solvent may be used. Generally, the organic solvent may be carbonates, carboxylates, lactones, phosphates, ethers, nitriles, sulfones, five or six member heterocyclic ring compounds, and organic compounds having at least one $C_1$-$C_4$ group connected through an oxygen atom to a carbon. Lactones may be methylated, ethylated and/or propylated. Other organic solvents can include ethylene carbonate, propylene carbonate, dimethyl carbonate, diethyl carbonate, ethyl methyl carbonate, methyl propyl carbonate, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, gamma-butyrolactone, 2-methyl-gamma-butyrolactone, 3-methyl-gamma-butyrolactone, 4-methyl-gamma-butyrolactone, delta-valerolactone, trimethyl phosphate, triethyl phosphate, tris(2,2,2-trifluoroethyl) phosphate, tripropyl phosphate, triisopropyl phosphate, tributyl phosphate, trihexyl phosphate, triphenyl phosphate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, sulfolane, dimethyl sulfone, ethyl methyl sulfone, and combinations thereof.

Methods for improving surface smoothness during electrodeposition of M1 on a substrate surface can comprise providing an electrolyte solution comprising cations of M1 from which M1 is deposited and a soluble, surface-smoothing additive comprising cations of a second conductive material (M2) and applying an electrical potential thereby reducing the cations of M1 and forming M1 on the substrate surface. The cations of M2 have an effective electrochemical reduction potential in the solution lower than that of the cations of M1. In preferred embodiments, the methods further comprise accumulating cations of M2 at protrusions on the substrate surface, thereby forming an electrostatically shielded region near each protrusion. The electrostatically shielded region can temporarily repel cations of M1, thus reducing the local effective current density and slowing deposition at the protrusion while enhancing deposition in regions away from the protrusions. In this way, the growth and/or amplification of the protrusions are suppressed and the surface heals to yield a relatively smoother surface.

In one embodiment, the method is applied to electrodeposition of lithium on a substrate surface. Lithium is an effective example because $Li^+$ ions have the lowest standard ERP among metals (at a concentration of 1 mol/L, a temperature of 298.15 K (25° C.), and a partial pressure of 101.325 kPa (absolute) (1 atm, 1.01325 bar) for each gaseous reagent). M2 cations, which have standard EPR values that are greater than lithium cations can have activity-dependent effective ERP values that are lower than those of the lithium cations.

According to such embodiments, the method comprises providing an electrolyte solution comprising lithium cations and a soluble, surface-smoothing additive comprising cations of a second conductive material (M2) selected from the group consisting of cesium, rubidium, potassium, strontium, barium, calcium, and combinations thereof. The cations of M2 have a concentration and activity coefficient in solution such that the effective electrochemical reduction potential of the cations of M2 is lower than that of the lithium cations. The method further comprises applying an electrical potential, thereby reducing the lithium cations and forming lithium on the substrate surface. The method further comprises accumulating cations of M2 at protrusions on the substrate surface, thereby forming an electrostatically shielded region near each protrusion and temporarily repelling the lithium cations from the electrostatically shielded regions. In some instances, the electrostatically shielded region has a higher impedance to retard the further deposition of lithium cations.

In particular embodiments, the concentration of M2 cations is less than, or equal to 30% of that of the lithium cations. In others, the M2 cation concentration is less than, or equal to, 5% of that of the lithium cations. Preferably, the surface-smoothing additive comprises an anion comprising $PF_6^-$ anion. The substrate can be a battery anode that comprises lithium or that comprises carbon.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

FIGS. 1-6 show a variety of embodiments and aspects of the present invention. Referring first to FIG. 1, a series of illustrations depict an embodiment of electrodeposition using an electrolyte 104 having a surface-smoothing additive. The additive comprises cations of M2 102, which have an effective ERP lower than that of the cations of M1 103. FIG. 1 illustrates how an electrostatically shielded region 106 can develop resulting in the self-healing of the unavoidable occurrence of surface protrusions 105 that would normally form. During the initial stage of deposition, both the cations of M1 and the cations of M2 are adsorbed on the substrate surface 100 (FIG. 1A) under an applied voltage ($E_a$) 101 slightly less than the reduction potential of the reactant ($E_r$) but larger than the additive reduction potential ($E_{M2/M2^+}$), that is, $E_r > E_a > E_{M2/M2^+}$). Cations of M1 will be deposited to form M1 on the substrate and will unavoidably form some protuberance tips due to various fluctuations in the system (FIG. 1B). A sharp edge or protrusion on the electrode exhibits a stronger electrical field, which will attract more positively charged cations (including both M1 and M2). Therefore, more cations of M1 will be preferentially deposited around the tips rather than on other smooth regions. In conventional electrodeposition, amplification of this behavior will form the surface roughness and/or dendrites. However, according to embodiments of the present invention, the adsorbed additive cations (M2+) have an effective ERP lower than $E_a$ (FIG. 1C) and will not be deposited (i.e., electrochemically or chemically consumed, reacted, and/or permanently bound) on the tip. Instead, they will be temporarily electrostatically attracted to and accumulated in the vicinity of the tip to form an electrostatic shield (FIG. 1D). This positively charged shield will repel incoming cations of M1 (e.g., like-charged species) at the protruded region while redirecting them to be deposited in non-protrusion regions. The net effect is that cations of M1 will be preferentially deposited in the smoother regions of the substrate (FIG. 1E) resulting in a smoother overall deposition surface (FIG. 1F). This process is persistently occurring and/or repeating during electrodeposition. The self-healing mechanism described herein resulting from embodiments of the present invention appears to disrupt the conventional roughness and/or dendrite amplification mechanism and leads to the deposition of a smooth film of M1 on the substrate.

The additive cation (M2+) exhibits an effective ERP, $E_{Red}$, less than that of the cations (M1+). In some instances, the standard ERP of the M2 cation will be less than that of the cations of M1. Surface-smoothing additives comprising such M2 species can be utilized with appropriate cations of M1 with few limitations on concentration and activity coefficient. However, in some instances, the M2 cation will have a standard ERP that is greater than that of the cations of M1. The concentration and activity coefficient of the M2 cations can be controlled such that the effective ERP of the M2 cations is lower than that of the reactant cations. For example, if the reactant is a Li+ ion, which has the lowest standard ERP among metals, then the concentration and activity coefficient of M2 cations can be controlled such that the effective ERP is lower than that of the lithium cations.

According to the Nernst equation:

$$E_{Red} = E_{Red}^{\phi} - \frac{RT}{zF} \ln \frac{\alpha_{Red}}{\alpha_{Ox}} \quad (1)$$

where R is the universal gas constant (=8.314472 J K$^{-1}$ mol$^{-1}$), T is the absolute temperature (assume T=25° C. in this work), α is the activity for the relevant species ($\alpha_{Red}$ is for the reductant and $\alpha_{Ox}$ is for the oxidant). $\alpha_x = \gamma_x c_x$, where $\gamma_x$ and $c_x$ are the activity coefficient and the concentration of species x. F is the Faraday constant (9.648 533 99×10$^4$ C mol$^{-1}$), z is the number of moles of electrons transferred. Although Li+ ion has the lowest standard reduction potential, $E_{Red}$(Li+), among all the metals when measured at a standard conditions (1 mol/L), a cation (M+) may have an effective reduction potential lower than those of lithium ion (Li+) if M+ has an activity $\alpha_x$ much lower than that of Li+. In the case of low concentration when the activity coefficient is unity, α can be simplified as concentration $c_x$, then Eq. (1) can be simplified as:

$$E_{Red} = E_{Red}^{\phi} - \frac{0.05916V}{z} \log_{10} \frac{1}{c_{Ox}} \quad (2)$$

Table 1 shows several the reduction potentials for several cations (vs. standard hydrogen electrode (SHE)) at various concentrations assuming that their activity coefficients, $\gamma_x$, equal one. When the concentration of Cs+, Rb+, and K+ is 0.01 M in an electrolyte, their effective ERPs are −3.144 V, −3.098 V and −3.049 V, respectively, which are less than those of Li+ at 1 M concentration (−3.040 V). As a result, in a mixed electrolyte where the additive (Cs+, Rb+, and K+) concentration is much less than Li+ concentration, these additives will not be deposited at the lithium deposition potential. In addition to a low concentration $c_x$, a very low activity coefficient $\gamma_x$ (which is strongly affected by the solvation and mobility of the cations in the given solvent and lithium salt) may also reduce the activity of cations and lead to an effective reduction potential lower than that of the lithium ion (Li+) as discussed below.

TABLE 1

The effective reduction potential of selected cations vs. SHE

| | Li+ | Cs+ | Rb+ | K+ |
|---|---|---|---|---|
| Stand reduction potential (1M) | −3.040 V | −3.026 V | −2.980 V | −2.931 V |
| Effective reduction potential at 0.05M* | — | −3.103 V | −3.06 V | −3.01 V |
| Effective reduction potential at 0.01M* | — | −3.144 V | −3.098 V | −3.049 V |

*Assume the activity coefficient $\gamma_x$ of species x equals 1.

Surface Smoothing Exhibited in Electrodeposition of Lithium

Embodiments of the present invention are illustrated well in the electrodeposition of lithium, since lithium ions have the lowest standard ERP among metals. However, the present invention is not limited to lithium but is defined by the claims.

The effect of several M2 cations has been examined for use in surface-smoothing additives in the electrodeposition of lithium. The cations all have standard ERP values, $E_{Red}^{\phi}$, that are close to that of Li+ ions. The electrolyte comprised 1 M LiPF$_6$ in propylene carbonate. Electrolyte solutions with surface-smoothing additives comprising 0.05 M RbPF$_6$, 0.5 M CsPF$_6$, or 0.15 M KPF$_6$ were compared to a control electrolyte with no additives. CsPF$_6$, RbPF$_6$, and Sr(PF$_6$)$_2$ were synthesized by mixing stoichiometric amount of AgPF$_6$ and the iodide salts of Cs, Rb, or Sr in a PC solution inside a glove box filled with purified argon where the oxygen and moisture content was less than 1 ppm. The formed AgI was filtered out from the solution using 0.45 μm syringe filters. The electrolyte preparation and lithium deposition were conducted inside the glove box as well. Lithium films were deposited on copper (Cu) foil substrates (10 mm×10 mm) in different electrolyte solutions at the desired current densities using a SOLARTRON® electrochemical Interface. After deposition, the electrode was washed with DMC to remove the residual electrolyte solvent and salt before the analyses.

Figure 1A:
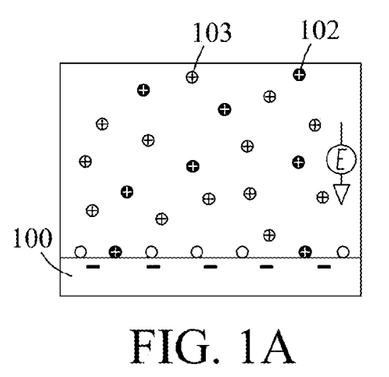
FIGS. 1A-1F are illustrations depicting an embodiment of electrodeposition using an electrolyte having a surface-smoothing additive.
Figure 1B:
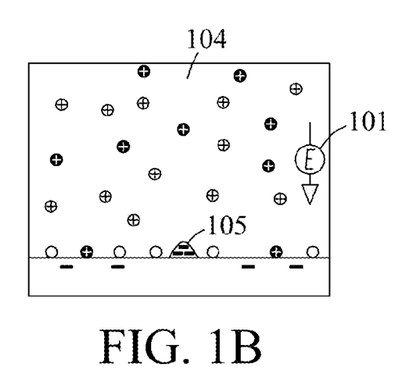
Figure 1C:
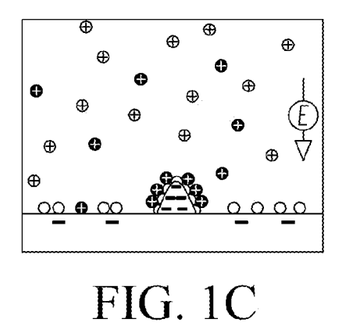
Figure 1D:
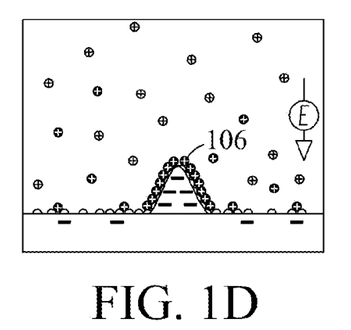
Figure 1E:
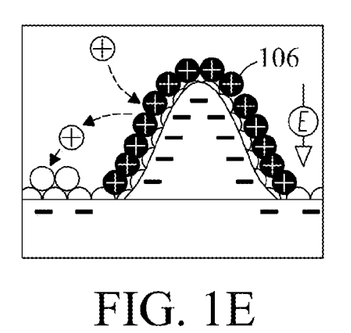
Figure 1F:
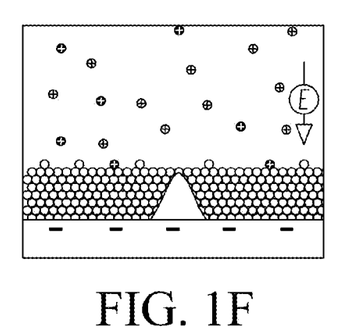
Figure 2A:
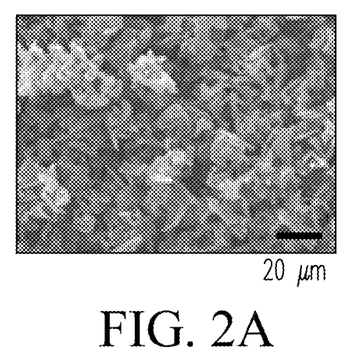
FIGS. 2A-2D include SEM micrographs of Li films deposited in an electrolyte with or without a surface-smoothing additive according to embodiments of the present invention; (a) No additive; (b) 0.05 M $RbPF_6$; (c) 0.05 M $CsPF_6$; (d) 0.15 M $KPF_6$.
Figure 2B:
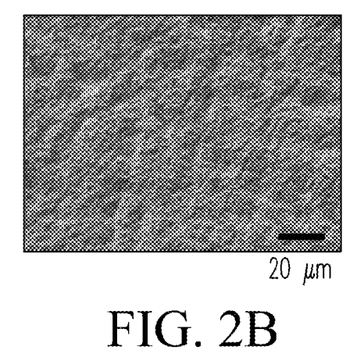
Figure 2C:
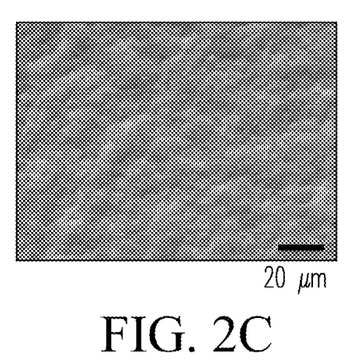
Figure 2D:
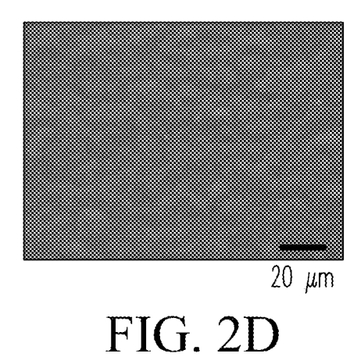

Referring to the scanning electron microscope (SEM) micrograph in FIG. 2A, when using the control electrolyte, the electrodeposited film exhibited conventional roughness and dendrite growth. The lithium film deposited in the electrolyte with 0.05 M Rb+ as the M2 cation exhibits a very fine surface morphology without dendrite formation as shown in FIG. 2B. Similarly, for the lithium films deposited with 0.05 M Cs+ additive, a dramatic change of the lithium morphology with no dendrite formation (see FIG. 2C) was obtained compared with the control experiment. Surprisingly, although $E_{Red}$ (K+) at 0.15 M is theoretically ~0.06 V higher than that of Li+ assuming both K+ and Li+ have an activity coefficient of 1. K metal did not deposit at the lithium deposition potential, and a lithium film with a mirror-like morphology was obtained using K+ as in the additive (FIG. 2D). This experimental finding suggests that the activity coefficient $\gamma_x$ for K+ ion's in this electrolyte is much less than those of Li+ leading to an actual $E_{Red}$ (K+) lower than $E_{Red}$ (Li+).

Generally, the concentration of the surface-smoothing additive is preferably high enough that protrusions can be effectively electrostatically shielded considering the effective ERP, the number of available M2 cations, and the mobility of the M2 cations. For example, in one embodiment, wherein the M2 cation comprises $K^+$, the reactant comprises $Li^+$ and M1 comprises lithium metal, the concentration of $K^+$ is greater than 0.05M.

Figure 3A:
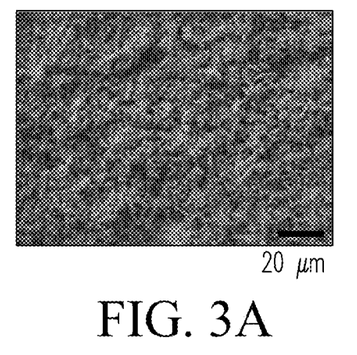
FIGS. 3A-3B include SEM micrographs of pre-formed dendritic Li film deposited in a control electrolyte for 1 hour and the same film after another 14 hours of Li deposition in the electrolyte with additive (0.05M $CsPF_6$), respectively.
Figure 3B:
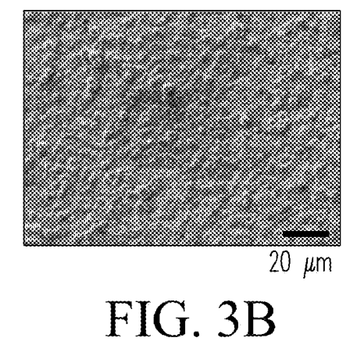

Referring to FIG. 3A, a dendritic lithium film was intentionally deposited on a copper substrate in a control electrolyte for 1 hour. The substrate and film was then transferred into an electrolyte comprising a surface-smoothing additive, 0.05 M $CsPF_6$ in 1 M $LiPF_6$/PC, to continue deposition for another 14 hours. Unlike the dendritic and mossy film deposited in the control electrolyte, the micrograph in FIG. 3B shows that a smooth lithium film was obtained after additional electrodeposition using embodiments of the present invention. The roughness, pits, and valleys shown in FIG. 3A have been filled by dense lithium deposits. The original needle-like dendritic whiskers have been converted to much smaller spherical particles which will also be buried if more lithium is deposited.

Figure 4A:
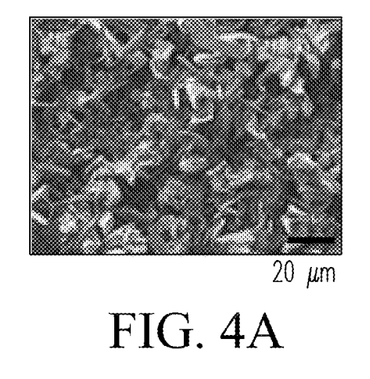
FIGS. 4A-4F include SEM micrographs of Li electrodes after repeated deposition/stripping cycles in the control electrolytes (a, b, and c) and with $Cs^+$-salt additive (d, e and f).
Figure 4B:
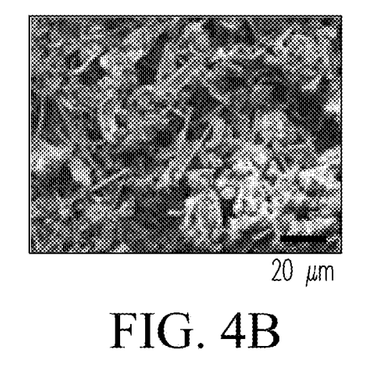
Figure 4C:
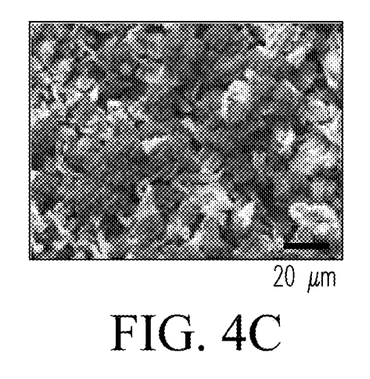
Figure 4D:
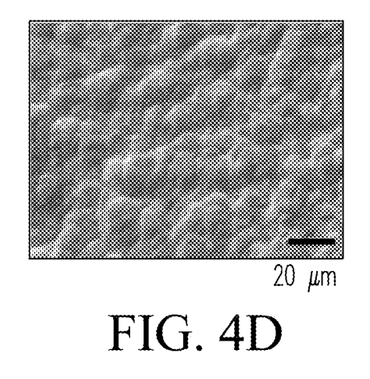
Figure 4E:
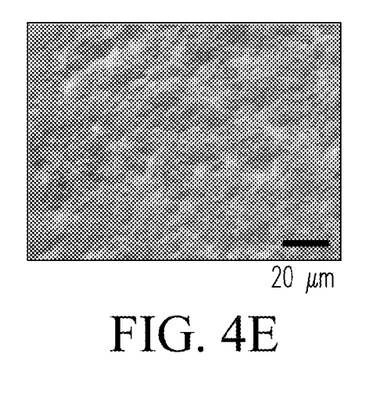
Figure 4F:
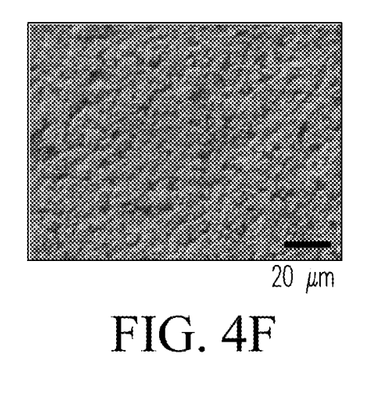

FIG. 4 includes SEM micrographs comparing the morphologies of the lithium electrodes after repeated deposition/stripping cycles ($2^{nd}$, $3^{rd}$, and $10^{th}$ cycle) in cells using the control electrolyte (see FIGS. 4A, 4B, and 4C) and using electrolyte with a surface-smoothing additive comprising 0.05M $Cs^+$ (see FIGS. 4D, 4E, and 4F). The large lithium dendrites and dark lithium particles are clearly observed on the lithium films deposited in the control electrolyte. In contrast, the morphologies of the lithium films deposited in the $Cs^+$-containing electrolyte still retain their dendrite free morphologies after repeated cycles. In all the films deposited with the additives, lithium films exhibit small spherical particles and smoother surfaces. This is in strong contrast with the needle-like dendrites grown in the control electrolyte.

Figure 5A:
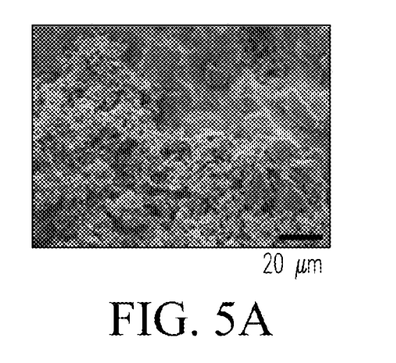
FIGS. 5A-5B include SEM micrographs of Li electrodes after 100 cycles in coin cells of Li|$Li_4Ti_5O_{12}$ containing electrolytes without (a) and with (b) 0.05 M $Cs^+$ additive.
Figure 5B:
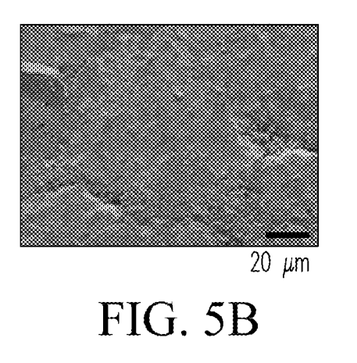

Electrolytes and methods described herein were also applied in rechargeable lithium metal batteries. Coin cells with Li|$Li_4Ti_5O_{12}$ electrodes were assembled using the control electrolyte. Similar cells were also assembled with electrolytes containing a surface smoothing additive comprising 0.05 M $Cs^+$. FIG. 5 contains SEM micrographs showing the morphologies of the lithium metal anodes after 100 charge/discharge cycles. Referring to FIG. 5A, the lithium electrode in the cell with no additive exhibits clear surface roughness and formation of dendrites. However, as shown in FIG. 5B, no dendritic lithium was observed on the lithium electrode in the cell with the surface-smoothing additive, even after 100 cycles.

Surface-smoothing additives comprising higher valence cations can also be used. Examples include, but are not limited to, $Sr^{2+}$, which have $E_{Red}^\phi$ values of −2.958 V (assuming $\gamma=1$) versus a standard hydrogen potential. The lower activity of these cations can result in an effective ERP lower than that of $Li^+$ ions. The larger size and higher charge should be accounted for in the non-aqueous electrolyte. Lithium films were deposited using the control electrolyte along with electrolytes comprising 0.05 M $Sr(PF_6)_2$. Deposition from the electrolyte comprising 0.05 M $Sr^2$ results in a lithium film that is smooth, free of dendrites, and void of Sr in/on the anode. This again indicates that the activity coefficient for $Sr^{2+}$ in these solutions is less than unity.

Using this approach, M2 cations of the surface-smoothing additive are not reduced and deposited on the substrate. The M2 cations are not consumed because these cations exhibit an effective reduction potential lower than that of the reactant. In contrast, traditional electrodeposition can utilize additives having a reduction potential higher than that of the cations of M1; therefore, they will be reduced during the deposition process and "sacrificed or consumed," for example, as part of an SEI film or as an alloy to suppress dendrite growth. As a result, the additive concentration in the electrolyte will decrease with increasing charge/discharge cycles and the effect of the additives will quickly degrade. In contrast, the M2 cations described herein will form a temporary electrostatic shield or "cloud" around the dendritic tips that retards further deposition of M1 in this region. This "cloud" will form whenever a protrusion is initiated, but it will dissipate once applied voltage is removed or the protrusion is eliminated. Accordingly, in some embodiments, the applied electrical potential is of a value that is less than, or equal to, the ERP of the cations of M1 and greater than the effective ERP of the cations of M2.

Lithium films having an SEI layer on the surface and deposited using electrolytes comprising 0.05 M $Cs^+$, $Rb^+$, $K^+$, or $Sr^{2+}$ additives were analyzed by x-ray photoelectron spectroscopy (XPS), Energy-dispersive X-ray spectroscopy (EDX) dot mapping, and Inductively coupled plasma atomic emission spectroscopy (ICP/AES) methods. XPS and EDX results did not show Cs, Rb, K, and Sr elements in the SEI films within the detectable limits of the analysis instruments. In addition, ICP-AES analysis did not identify Cs, Rb, K, and Sr elements in the bulk of deposited lithium film (including the SEI layer on the surface) within detectable limits.

Figure 6A:
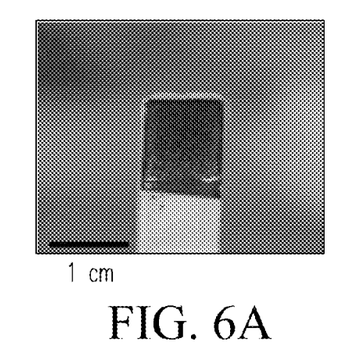
FIGS. 6A-6F include optical and SEM micrographs of hard carbon electrodes after charging to 300% of the regular capacity in the control electrolyte (a, c, e) and in an electrolyte with 0.05 M $CsPF_6$ additive added in the control electrolyte (b, d, f).
Figure 6B:
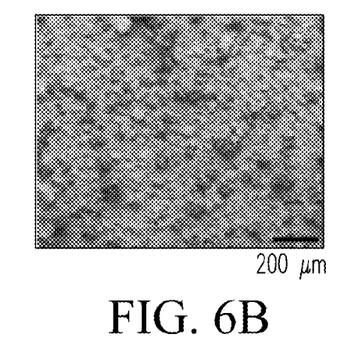
Figure 6C:
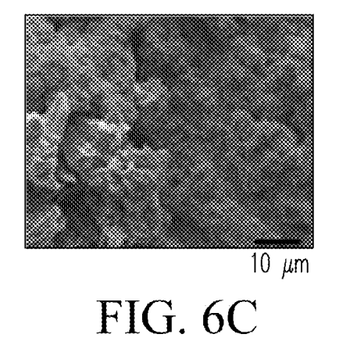
Figure 6D:
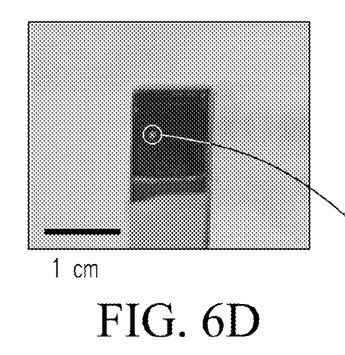
Figure 6E:
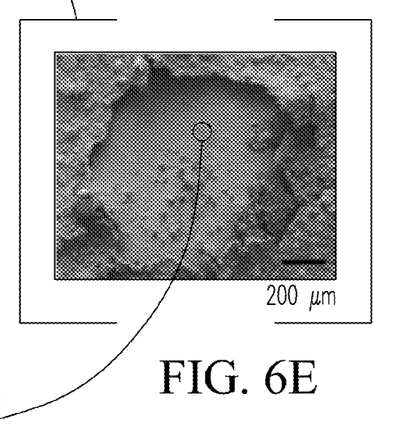
Figure 6F:
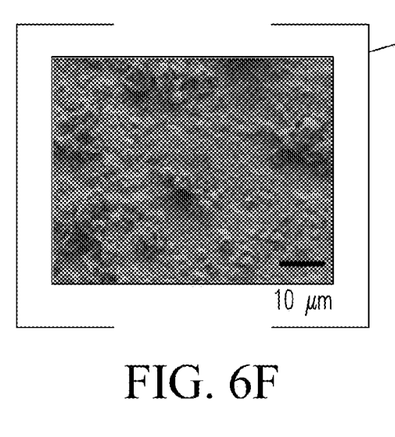

Dendrite formation is not only a critical issue in rechargeable lithium metal batteries, but also an important issue in high power lithium ion batteries because lithium metal dendrites can grow at the anode surface when the lithium ions cannot move quickly enough to intercalate into the anode, which can comprise graphite or hard carbon, during rapid charging. In this case, the lithium dendrites can lead to short circuits and thermal runaway of the battery. Accordingly, a carbonaceous anode is described herein to demonstrate suppression of lithium dendrite growth in a lithium ion battery. FIG. 6 compares the optical (6A and 6D) and SEM images (6B, 6C, 6E, and 6F) of lithium particles formed on the hard carbon anode after it was charged to 300% of its theoretical capacity in a control electrolyte (without additives) and in an electrolyte having a surface smoothing additive comprising 0.05 M $CsPF_6$. A significant amount of lithium metal was deposited on the surface of carbon electrode (see grey spots in FIG. 6A) for the sample overcharged in the control electrolyte. FIGS. 6B and 6C show clear dendritic growth on the electrode surface. In contrast, no lithium metal deposition was observed on the surface of carbon electrode (see FIG. 6D) for the sample overcharged in the electrolyte with 0.05M $Cs^+$ additive (the white line on the bottom of the carbon sample is due to an optical reflection). After removing a small piece of carbon from the sample (see the circled area in FIG. 6D), it was found that excess lithium was preferentially grown on the bottom of the carbon electrode as shown in FIGS. 6E and 6F.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. An energy storage device comprising an anode and a first metal (M1) electrodeposited on the anode during operation of the device, the energy storage device characterized by an electrolyte solution comprising cations of M1 and by a soluble, surface-smoothing additive comprising a metal (M2), cations of M2 having an effective electromechanical reduction potential in solution lower than that of the cations of M1, and a voltage that is less than, or equal to, that of the electrochemical reduction potential of the cations of M1 and greater than the effective electrochemical reduction potential of the cations of M2, wherein the cations of M2 have a concentration in the electrolyte solution that is greater than or equal to 0.05 M and less than, or equal to, 5% of that of the cations of M1.

2. The device of claim 1, wherein the anode comprises carbon.

3. The device of claim 1, wherein the anode comprises lithium metal.

4. The device of claim 1, wherein the anode comprises silicon, silicon oxide, tin, tin oxide, antimony, sodium, magnesium, or combinations thereof.

5. The device of claim 4, wherein the anode further comprises carbonaceous material or a combination of carbonaceous material and lithium powder.

6. The device of claim 1, wherein the surface-smoothing additive comprises an anion comprising $PF_6^-$ anion.

7. The device of claim 1, wherein M1 comprises Li.

8. The device of claim 1, wherein M2 comprises at least one metal selected from a group consisting of Cs, Rb, K, Ba, Sr, Ca, Li, Na, Mg, Al, Eu and combinations thereof, and wherein M2 is not the same as M1.

9. The device of claim 1, wherein the cations of M2 have an activity in solution such that the effective electrochemical reduction potential of M2 is lower than that of the cations of M1.

10. The device of claim 1, wherein the cations of M2 have a concentration in the electrolyte solution that is greater than or equal to 0.05 M and less than, or equal to, 30% of that of the cations of M1.

11. The device of claim 1, wherein the cations of M2 are not electrochemically nor chemically reactive with respect to M1 or the cations of M1.

12. The device of claim 1, further comprising a cathode comprising:
$Li_{4-x}M_xTi_5O_{12}$ (M=Mg, Al, Ba, Sr, or Ta; $0 \leq x \leq 1$),
$MnO_2$,
$V_2O_5$,
$V_6O_{13}$,
$LiV_3O_8$,
$LiM^{C1}_xM^{C2}_{1-x}PO_4$ ($M^{C1}$ or $M^{C2}$=Fe, Mn, Ni, Co, Cr, or Ti; $0 \leq x \leq 1$),
$Li_3V_{2-x}M_x(PO_4)_3$ (M=Cr, Co, Fe, Mg, Y, Ti, Nb, or Ce; $0 \leq x \leq 1$),
$LiVPO_4F$,
$LiM^{C1}_xM^{C2}_{1-x}O_2$ ($M^{C1}$ or $M^{C2}$=Fe, Mn, Ni, Co, Cr, Ti, Mg, Al; $0 \leq x \leq 1$),
$LiM^{C1}_xM^{C2}_yM^{C3}_{1-x-y}O_2$ ($M^{C1}$, $M^{C2}$, or $M^{C3}$=Fe, Mn, Ni, Co, Cr, Ti, Mg, or Al; $0 \leq x \leq 1$; $0 \leq y \leq 1$),
$LiMn_{2-y}X_yO_4$ (X=Cr, Al, or Fe, $0 \leq y \leq 1$),
$LiNi_{0.5-y}X_yMn_{1.5}O_4$ (X=Fe, Cr, Zn, Al, Mg, Ga, V, or Cu; $0 \leq y \leq 0.5$),
$xLi_2MnO_3 \cdot (1-x)LiM^{C1}_yM^{C2}_zM^{C3}_{1-y-z}O_2$ ($M^{C1}$, $M^{C2}$, or $M^{C3}$=Mn, Ni, Co, Cr, Fe, or mixture thereof; x=0.3-0.5; $y \leq 0.5$; $z \leq 0.5$),
$Li_2MSiO_4$ (M=Mn, Fe, or Co),
$Li_2MSO_4$ (M=Mn, Fe, or Co),
$LiMSO_4F$ (Fe, Mn, or Co),
$Li_{2-x}(Fe_{1-y}Mn_y)P_2O_7$ ($0 \leq y \leq 1$),
$Cr_3O_8$, or
$Cr_2O_5$.

13. An energy storage device comprising an anode having lithium metal, the energy storage device characterized by an electrolyte solution comprising Li cations and a soluble, surface-smoothing additive comprising at least one metal (M2), cations of M2 having a concentration in solution greater than or equal to 0.05 M and less than 30% of that of the Li cations and having an effective electromechanical reduction potential in solution lower than that of the Li cations, wherein M2 comprises a metal selected from a group of consisting of cesium, rubidium, potassium, strontium, barium, and combinations thereof, and a voltage less than, or equal to, that of the electromechanical reduction potential of the Li cations and greater than the effective electrochemical reduction potential of the cations of M2 such that Li cations are reduced and the cations of M2 are not reduced.

14. The device of claim 13, wherein the surface-smoothing additive comprises an anion comprising $PF_6^-$ anion.

15. The device of claim 13, wherein the concentration of M2 cations is less than, or equal to, 20% of the Li cations.

16. The device of claim 13, wherein the anode comprises lithium metal.

17. The device of claim 13, wherein the anode comprises carbon.

18. The device of claim 13, wherein the anode comprises silicon, silicon oxide, tin, tin oxide, antimony, sodium, magnesium, or combinations thereof.

19. The device of claim 18, wherein the anode further comprises carbonaceous material or a combination of carbonaceous material and lithium powder.

20. The device of claim 13, having a separator between the anode and the cathode, the anode comprising lithium and a non-intercalation carbon layer between the lithium and the separator.

21. An energy storage device comprising an anode and a first metal (M1) electrodeposited on the anode during operation of the device, the energy storage device characterized by an electrolyte solution comprising cations of M1 and by a soluble, surface-smoothing additive comprising a metal (M2), cations of M2 having a concentration greater than or equal to 0.05 M and less than 10% of that of cations of M1, wherein the cations of M2 have an effective electrochemical reduction potential in solution lower than that of the cations of M1, and an energy voltage source that applies a voltage less than, or equal to, that of the electrochemical reduction potential of the cations of M1 and greater than the effective electrochemical reduction potential of the cations of M2.

22. The device of claim 1, wherein the cations of M2 have a standard electrochemical reduction potential greater than that of the cations of M1.

* * * * *